United States Patent
Harris et al.

(10) Patent No.: US 7,225,874 B2
(45) Date of Patent: Jun. 5, 2007

(54) METHODS AND COMPOSITIONS FOR REDUCING THE VISCOSITY OF TREATMENT FLUIDS USED IN SUBTERRANEAN OPERATIONS

(75) Inventors: Phillip C. Harris, Duncan, OK (US); Stanley J. Heath, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/203,045

(22) Filed: Aug. 12, 2005

(65) Prior Publication Data
US 2007/0034376 A1 Feb. 15, 2007

(51) Int. Cl.
*E21B 43/27* (2006.01)
*E21B 43/26* (2006.01)

(52) U.S. Cl. ............... 166/300; 166/308.1; 166/308.3; 166/308.5

(58) Field of Classification Search ............ None
See application file for complete search history.

(56) References Cited

U.S. PATENT DOCUMENTS

| | | | |
|---|---|---|---|
| 3,727,688 A * | 4/1973 | Clampitt | 166/283 |
| 4,220,566 A * | 9/1980 | Constien et al. | 523/131 |
| 4,552,674 A * | 11/1985 | Brown et al. | 507/211 |
| 4,982,793 A | 1/1991 | Holtmyer et al. | 166/305 |
| 5,067,565 A | 11/1991 | Holtmyer et al. | 166/305.1 |
| 5,122,549 A | 6/1992 | Holtmyer et al. | 523/130 |
| 5,143,157 A * | 9/1992 | Harms | 166/300 |
| 5,413,178 A | 5/1995 | Walker et al. | 166/300 |
| 5,759,964 A | 6/1998 | Shuchart et al. | 507/209 |
| 6,311,773 B1 * | 11/2001 | Todd et al. | 166/280.2 |
| 6,698,519 B2 * | 3/2004 | Nguyen et al. | 166/294 |

OTHER PUBLICATIONS

"Studies on the Bromate Oscillators with 1,4-Cyclohexanedione" (*available at* http://www.chem.elte.hu/departments/anal/szalai/chd_en.html).

"Organic Chemistry Microscale Projection Experiments: Chemistry en miniature," and associated experimental procedures (*available at* http://www.uni-regensburg.de/Fakultaeten/nat_Fak_IV/Organische_Chemie/Didaktik/Keusch/proj-e.htm).

(Continued)

*Primary Examiner*—Zakiya Bates
*Assistant Examiner*—Angela DiTrani
(74) *Attorney, Agent, or Firm*—Robert A. Kent; Baker Botts

(57) ABSTRACT

Methods and compositions for reducing the viscosity of subterranean treatment fluids that comprise a gelling agent utilizing breakers that comprise hydroquinone and/or a derivative thereof. In one embodiment, the present invention provides a method comprising: providing a treatment fluid that comprises an aqueous base fluid and a gelling agent; providing a breaker that comprises a hydroquinone component; allowing the breaker to interact with the treatment fluid; and allowing the breaker to at least partially reduce the viscosity of the treatment fluid.

19 Claims, 2 Drawing Sheets

OTHER PUBLICATIONS

Madhiri, Nicholas, et al., "Oxyhalogen-sulfur chemistry: kinetics and mechanism of oxidation of formamidine disulfide by acidic bromate," *Phys. Chem. Chem. Phys.* 2003, 5, 4149-4156.

Kurin-Csorgei, K., et al., "The 1,4-Cyclohexanedione-Bromate-Acid Oscillatory System I, Its Organic Chemistry," *React. Kinet. Catal. Lett.* 1994, 53, 115-121.

Balla, Jozsef, et. al., "Copper (II)-Catalyzed Oxidation of Catechol by Molecular Oxygen in Aqueous Solution," *Inorg. Chem.* 1992, 31, 58-62.

Foreign communciation related to a counterpart application dated Oct. 25, 2006.

* cited by examiner

METHODS AND COMPOSITIONS FOR REDUCING THE VISCOSITY OF TREATMENT FLUIDS USED IN SUBTERRANEAN OPERATIONS

CROSS-REFERENCE TO RELATED APPLICATIONS

This application is related to co-pending U.S. patent application Ser. No. 11/203,071, entitled "Methods and Compositions for Reducing the Viscosity of Treatment Fluids Used in Subterranean Operations," filed on the same day, the entirety of which is herein incorporated by reference.

BACKGROUND

The present invention relates to methods and compositions for use in subterranean operations. More particularly, the present invention relates to methods of reducing the viscosity of subterranean treatment fluids that comprise a gelling agent utilizing breakers that comprise hydroquinone and/or a derivative thereof.

Treatment fluids may be used in a variety of subterranean treatments, including, but not limited to, stimulation treatments and sand control treatments. As used herein, the term "treatment," or "treating," refers to any subterranean operation that uses a fluid in conjunction with a desired function and/or for a desired purpose. The term "treatment," or "treating," does not imply any particular action by the fluid or any particular component thereof.

One common production stimulation operation that employs a treatment fluid is hydraulic fracturing. Hydraulic fracturing operations generally involve pumping a treatment fluid (e.g., a fracturing fluid) into a well bore that penetrates a subterranean formation at a sufficient hydraulic pressure to create or enhance one or more cracks, or "fractures," in the subterranean formation. The fracturing fluid may comprise particulates, often referred to as "proppant," that are deposited in the fractures. The proppant particulates, inter alia, prevent the fractures from fully closing upon the release of hydraulic pressure, forming conductive channels through which fluids may flow to the well bore. Once at least one fracture is created and the proppant particulates are substantially in place, the fracturing fluid may be "broken" (i.e., the viscosity is reduced), and the fracturing fluid may be recovered from the formation.

Treatment fluids are also utilized in sand control treatments, such as gravel packing. In gravel-packing treatments, a treatment fluid suspends particulates (commonly referred to as "gravel particulates") for delivery to a desired area in a well bore, e.g., near unconsolidated or weakly-consolidated formation zones, to form a gravel pack to enhance sand control. One common type of gravel-packing operation involves placing a sand control screen in the well bore and packing the annulus between the screen and the well bore with the gravel particulates of a specific size to prevent the passage of formation sand. The gravel particulates act, inter alia, to prevent the formation particulates from occluding the screen or migrating with the produced hydrocarbons, and the screen acts, inter alia, to prevent the particulates from entering the production tubing. Once the gravel pack is substantially in place, the viscosity of the treatment fluid may be reduced to allow it to be recovered. In some situations, fracturing and gravel-packing treatments are combined into a single treatment (commonly referred to as "frac pack" operations). In such "frac pack" operations, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Maintaining sufficient viscosity in these treatment fluids is important for a number of reasons. Maintaining sufficient viscosity is important in fracturing and sand control treatments for particulate transport and/or to create or enhance fracture width. Also, maintaining sufficient viscosity may be important to control and/or reduce fluid-loss into the formation. Moreover, a treatment fluid of a sufficient viscosity may be used to divert the flow of fluids present within a subterranean formation (e.g., formation fluids, other treatment fluids) to other portions of the formation, for example, by "plugging" an open space within the formation. At the same time, while maintaining sufficient viscosity of the treatment fluid often is desirable, it also may be desirable to maintain the viscosity of the treatment fluid in such a way that the viscosity may be reduced at a particular time, inter alia, for subsequent recovery of the fluid from the formation.

To provide the desired viscosity, polymeric gelling agents may be added to the treatment fluids. Examples of commonly used polymeric gelling agents include, but are not limited to, guar gums and derivatives thereof, cellulose derivatives, biopolymers, polysaccharides, synthetic polymers, and the like. To further increase the viscosity of a treatment fluid, often the molecules of the gelling agent are "crosslinked" with the use of a crosslinking agent. Conventional crosslinking agents usually comprise a metal ion that interacts with at least two polymer molecules to form a "crosslink" between them.

At some point in time, e.g., after a viscosified treatment fluid has performed its desired function, the viscosity of the viscosified treatment fluid should be reduced. This is often referred to as "breaking the gel" or "breaking the fluid." This can occur by, inter alia, reversing the crosslink between crosslinked polymer molecules, breaking down the molecules of the polymeric gelling agent, or breaking the crosslinks between polymer molecules. The use of the term "break" herein incorporates at least all of these mechanisms. Certain breakers that are capable of breaking treatment fluids comprising crosslinked gelling agents are known in art. For example, breakers comprising sodium bromate, sodium chlorite, and other oxidizing agents have been used to reduce the viscosity of treatment fluids comprising crosslinked polymers. Examples of such breakers are described in U.S. Pat. No. 5,759,964 to Shuchart, et al., and U.S. Pat. No. 5,413,178 to Walker, et al., the relevant disclosures of which are herein incorporated by reference. However, many of these breakers are only effective in reducing the viscosity of a treatment fluid at neutral-to-alkaline pH levels (i.e., above about pH 6). Excessive concentrations of those breakers and/or additional catalysts may be required to effectively reduce the viscosity of a treatment fluid at lower pH levels (e.g., below about pH 6). High concentrations of breaker and/or additional catalysts may be problematic since they may, among other things, increase the cost and complexity of a treatment fluid, adversely affect other components of the treatment fluid, and/or leave damaging residues in the subterranean formations where they are used.

SUMMARY

The present invention relates to methods and compositions for use in subterranean operations. More particularly, the present invention relates to methods of reducing the viscosity of subterranean treatment fluids that comprise a gelling agent utilizing breakers that comprise hydroquinone and/or a derivative thereof.

In one embodiment, the present invention provides a method comprising: providing a treatment fluid that comprises an aqueous base fluid and a gelling agent; providing a breaker that comprises a hydroquinone component; allowing the breaker to interact with the treatment fluid; and allowing the viscosity of the treatment fluid to reduce.

In another embodiment, the present invention provides a method comprising: providing a treatment fluid that comprises an aqueous base fluid, a gelling agent, and a breaker that comprises a hydroquinone component; introducing the treatment fluid into the portion of the subterranean formation; and allowing the viscosity of the treatment fluid to reduce.

In another embodiment, the present invention provides a method comprising: providing a treatment fluid that comprises an aqueous base fluid and a gelling agent; providing a breaker that comprises a hydroquinone component; introducing the treatment fluid into a portion of the subterranean formation at or above a pressure sufficient to create or enhance one or more fractures in a portion of the subterranean formation; allowing the breaker to interact with the treatment fluid; and allowing the viscosity of the treatment fluid to reduce.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
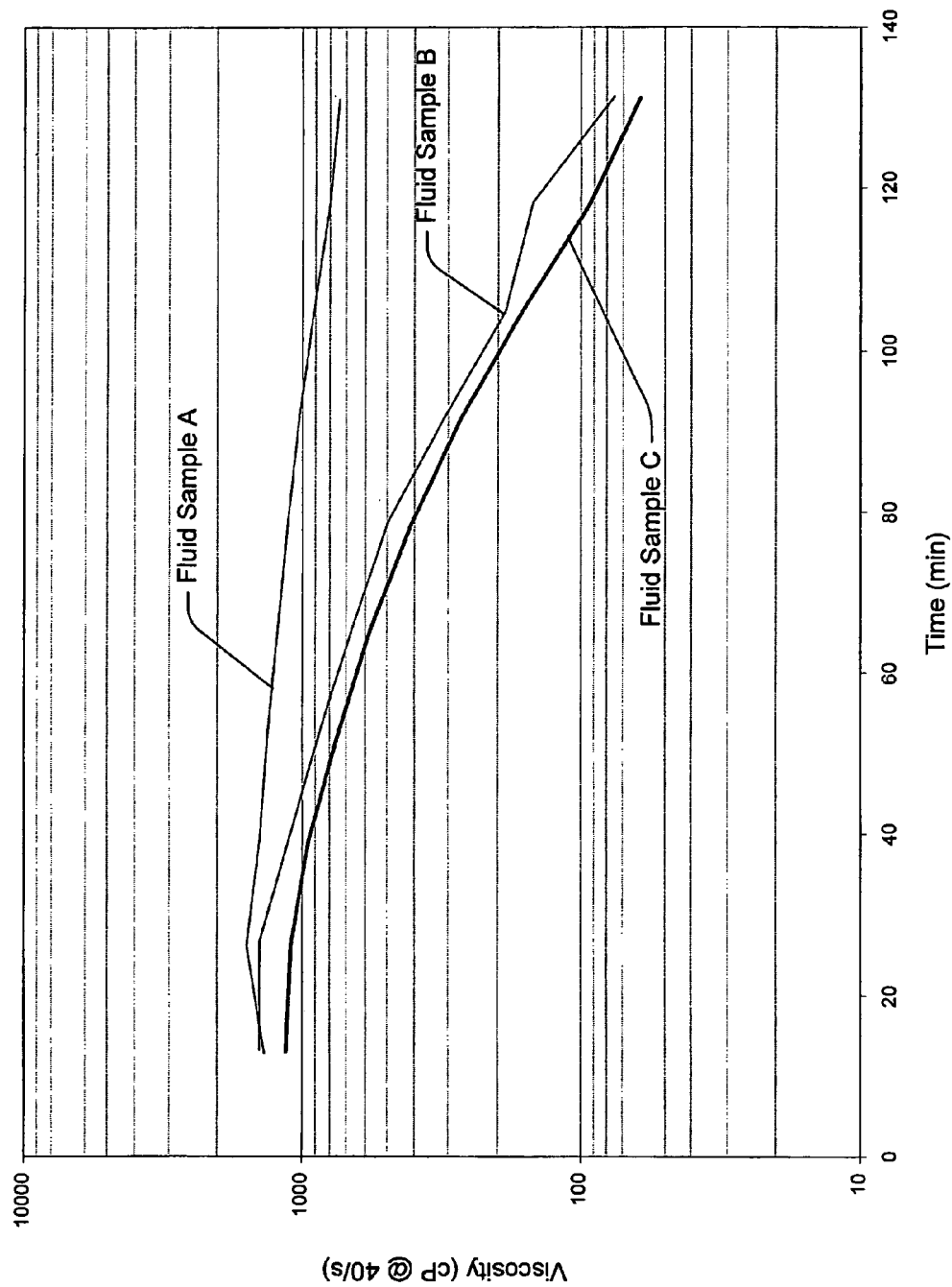
FIG. 1 illustrates data regarding the change in viscosity over time of various treatment fluids, including certain embodiments of the treatment fluids of the present invention.

The present invention relates to methods and compositions for use in subterranean operations. More particularly, the present invention relates to methods of reducing the viscosity of subterranean treatment fluids that comprise a gelling agent utilizing breakers that comprise hydroquinone and/or a derivative thereof.

The treatment fluids of the present invention generally comprise an aqueous base fluid, a gelling agent, and a breaker of the present invention that comprises a hydroquinone component. In certain embodiments, the gelling agent may comprise a "crosslinked gelling agent," which is defined herein to mean that at least a portion of the gelling agent may be crosslinked by a crosslinking reaction comprising a crosslinking agent. The term "hydroquinone component" is used herein to refer to hydroquinone or a derivative thereof. The term "derivative" is defined herein to include any compound that is made from the base compound, for example, by replacing one atom in the base compound with another atom or group of atoms. It is believed that breakers of the present invention may reduce the viscosity of a treatment fluid comprising a gelling agent and/or a crosslinked gelling agent at a pH in the range from about 3 to about 12 with lower concentrations of breaker than the concentration of a conventional breaker that would be required to achieve the same results. In certain embodiments, a breaker of the present invention may be used according to the present invention to reduce the viscosity of a treatment fluid comprising a gelling agent and/or a crosslinked gelling agent, wherein the pH of the treatment fluid is in the range from about 4 to about 6.

The aqueous base fluid used in the treatment fluids of the present invention may comprise fresh water, saltwater (e.g., water containing one or more salts dissolved therein), brine, seawater, or combinations thereof. Generally, the water may be from any source, provided that it does not contain components that might adversely affect the stability and/or performance of the treatment fluids of the present invention, for example, copper ions, iron ions, or certain types of organic materials (e.g., lignin). In certain embodiments, the density of the aqueous base fluid can be increased, among other purposes, to provide additional particle transport and suspension in the treatment fluids of the present invention. In certain embodiments, the pH of the aqueous base fluid may be adjusted (e.g., by a buffer or other pH adjusting agent), among other purposes, to activate a crosslinking agent, and/or to reduce the viscosity of the treatment fluid (e.g., activate a breaker, deactivate a crosslinking agent). In these embodiments, the pH may be adjusted to a specific level, which may depend on, among other factors, the types of gelling agents, crosslinking agents, and/or breakers included in the treatment fluid. One of ordinary skill in the art, with the benefit of this disclosure, will recognize when such density and/or pH adjustments are appropriate.

The gelling agents utilized in the present invention may comprise any polymeric material capable of increasing the viscosity of an aqueous fluid. In certain embodiments, the gelling agent may comprise polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally-occurring, synthetic, or a combination thereof. In certain embodiments, suitable gelling agents may comprise polysaccharides, and derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), and combinations thereof. In certain embodiments, the gelling agents comprise an organic carboxylated polymer, such as CMHPG. In certain embodiments, the derivatized cellulose is a cellulose grafted with an allyl or a vinyl monomer, such as those disclosed in U.S. Pat. Nos. 4,982,793; 5,067,565; and 5,122,549, the relevant disclosures of which are incorporated herein by reference. Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used.

The gelling agent may be present in the treatment fluids of the present invention in an amount sufficient to provide the desired viscosity. In some embodiments, the gelling agents may be present in an amount in the range of from about 0.12% to about 2.0% by weight of the treatment fluid. In certain embodiments, the gelling agents may be present in an amount in the range of from about 0.18% to about 0.72% by weight of the treatment fluid.

In those embodiments of the present invention wherein it is desirable to crosslink the gelling agent, the treatment fluid may comprise one or more of the crosslinking agents. The crosslinking agents may comprise a metal ion that is capable of crosslinking at least two molecules of the gelling agent. Examples of suitable crosslinking agents include, but are not limited to, borate ions, zirconium IV ions, titanium IV ions, aluminum ions, antimony ions, chromium ions, iron ions, copper ions, and zinc ions. These ions may be provided by providing any compound that is capable of producing one or more of these ions; examples of such compounds include, but are not limited to, boric acid, disodium octaborate tetrahydrate, sodium diborate, pentaborates, ulexite, colemanite, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof. In certain embodiments of the present invention, the crosslinking agent may be formulated to remain inactive until it is "activated" by, among other things, certain conditions in the fluid (e.g., pH, temperature, etc.) and/or contact with some other substance. In some embodiments, the crosslinking agent may be delayed by encapsulation with a coating (e.g., a porous coating through which the breaker may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the following: the type of gelling agent included, the molecular weight of the gelling agent(s), the pH of the treatment fluid, temperature, and/or the desired time for the crosslinking agent to crosslink the gelling agent molecules.

When included, suitable crosslinking agents may be present in the treatment fluids of the present invention in an amount sufficient to provide, inter alia, the desired degree of crosslinking between molecules of the gelling agent. In certain embodiments, the crosslinking agent may be present in the treatment fluids of the present invention in an amount in the range of from about 0.0005% to about 0.2% by weight of the treatment fluid. In certain embodiments, the crosslinking agent may be present in the treatment fluids of the present invention in an amount in the range of from about 0.001% to about 0.05% by weight of the treatment fluid. One of ordinary skill in the art, with the benefit of this disclosure, will recognize the appropriate amount of crosslinking agent to include in a treatment fluid of the present invention based on, among other things, the temperature conditions of a particular application, the type of gelling agents used, the molecular weight of the gelling agents, the desired degree of viscosification, and/or the pH of the treatment fluid.

The breakers of the present invention comprise a hydroquinone component. The term "hydroquinone component" is used herein to refer to hydroquinone or a derivative thereof. Derivatives of hydroquinone that may be used in the present invention include, but are not limited to, semi-quinone, benzoquinone, catechol, quinhydrone charge-transfer complexes, and the like. In certain embodiments of the present invention, the breaker may comprise a combination of a hydroquinone component and an "additional breaker component," which herein refers to any other breaker known in the art. Examples of suitable additional breakers include, but not limited to, sodium chlorite, sodium bromate, sodium persulfate, sodium peroxydisulfate, ammonium chlorite, ammonium bromate, ammonium persulfate, ammonium peroxydisulfate, potassium chlorite, potassium bromate, potassium persulfate, postassium peroxydisulfate, one or more oxidizable metal ions (i.e., a metal ion whose oxidation state can be increased by the removal of an electron, such as copper, cobalt, iron, manganese, vanadium), and the like. Examples of such additional breakers are described in U.S. Pat. No. 5,759,964 to Shuchart, et al., and U.S. Pat. No. 5,413,178 to Walker, et al., the relevant disclosures of which are herein incorporated by reference. In certain embodiments of the present invention, the breaker may be formulated to remain inactive until it is "activated" by, among other things, certain conditions in the fluid (e.g., pH, temperature, etc.) and/or contact with some other substance. In some embodiments, the breaker may be delayed by encapsulation with a coating (e.g., a porous coating through which the breaker may diffuse slowly, or a degradable coating that degrades down hole) that delays the release of the breaker until a desired time or place.

The breaker should be present in the treatment fluids of the present invention in an amount sufficient to provide the desired viscosity reduction. In certain embodiments, the breaker may be may be present in the treatment fluids of the present invention such that the concentration of the hydroquinone component is in the range of from about 0.001% to about 0.3% by weight of the treatment fluid. In certain embodiments, the breaker may be may be present in the treatment fluids of the present invention such that the concentration of the hydroquinone component is in the range of from about 0.001% to about 0.025% by weight of the treatment fluid. The amount and composition of the breaker utilized in the present invention may depend upon a number of factors, including temperature, the type and/or amount of gelling agents used, the type and/or amount of crosslinking agent used, the pH of the treatment fluid, and the like. One skilled in the art, with the benefit of this disclosure, will recognize the amount and type of breaker suitable for a particular application of the present invention.

The treatment fluids of the present invention optionally may comprise one or more additional additives known in the art, including, but not limited to, fluid loss control additives, gel stabilizers, gas, salts (e.g., KC1), pH-adjusting agents (e.g., buffers), corrosion inhibitors, dispersants, flocculants, acids, foaming agents, antifoaming agents, $H_2S$ scavengers, lubricants, oxygen scavengers, weighting agents, scale inhibitors, surfactants, catalysts, clay control agents, biocides, friction reducers, particulates (e.g., proppant particulates, gravel particulates), combinations thereof, and the like. For example, a gel stabilizer compromising sodium thiosulfate may be included in certain treatment fluids of the present invention. Individuals skilled in the art, with the benefit of this disclosure, will recognize the types of additives that may be suitable for a particular application of the present invention. For example, particulates may be included in the treatment fluids of the present invention in certain types of subterranean operations, including fracturing operations, gravel-packing operations, and the like.

The methods of the present invention generally comprise: providing a treatment fluid of the present invention comprising an aqueous base fluid and a gelling agent; providing a breaker comprising a hydroquinone component; allowing the breaker to interact with the treatment fluid; and allowing the breaker to at least partially reduce the viscosity of the treatment fluid. In certain embodiments, the gelling agent may comprise a crosslinked gelling agent. The breaker comprising the hydroquinone component may be provided separately or as a component of the treatment fluid in practicing the methods of the present invention. For example, the breaker comprising the hydroquinone component may be added to the treatment fluid as it is pumped into a portion of a subterranean formation through a well bore penetrating the subterranean formation. In some embodiments, the methods of the present invention further comprise introducing the treatment fluid into at least a portion of a subterranean formation. In those embodiments, at least a portion of the gelling agent may be or become a crosslinked gelling agent prior to, during, or subsequent to introducing the treatment fluid into the subterranean formation. For example, the crosslinking agent may be formulated to crosslink the gelling agent at some time after the treatment fluid is introduced into the subterranean formation.

The treatment fluid may be provided and introduced into the subterranean formation in certain embodiments of the present invention by any means known in the art. The treatment fluid may be prepared at the job site, or certain components of the treatment fluid (e.g., the aqueous base fluid and the gelling agent) may be pre-mixed several hours prior to use and then transported to the job site. Certain components of the treatment fluid may be provided as a "dry mix" to be combined with the aqueous base fluid and/or other components prior to or during introducing the treatment fluid into the subterranean formation. In certain embodiments, the treatment fluid may be introduced into the subterranean formation by pumping the treatment fluid into a well bore that penetrates a portion of the subterranean formation. In certain embodiments (e.g., fracturing operations), the treatment fluid may be introduced into the subterranean formation at or above a pressure sufficient to create or enhance one or more fractures in a portion of the subterranean formation. In certain embodiments, the treatment fluid may comprise a plurality of particulates (e.g., sand, gravel, bauxite, ceramic materials, glass materials, polymer materials, wood, fibrous materials, and/or composite particulates), which may be used, inter alia, to prop open one or more fractures in the subterranean formation and/or to form a gravel pack in or adjacent to a portion of the subterranean formation.

The breaker may be allowed to at least partially reduce the viscosity of the treatment fluid at any point in the course of the treatment, for example, at the conclusion of a particular treatment of a subterranean formation in order to facilitate recovery of the fluid from the formation. In certain embodiments, the viscosity of the treatment fluid may be reduced and the treatment fluid may be recovered so as to deposit particulates therein in at least a portion of the subterranean formation and/or one or more fractures therein.

The methods of the present invention may be used in any subterranean operation involving the introduction of a treatment fluid into a subterranean formation wherein the viscosity of the treatment fluid is reduced, including, but not limited to, fracturing operations, gravel-packing operations, frac-packing operations, well bore cleanout operations, and the like. In certain embodiments of the present invention, the treatment fluid may be introduced into a portion of a subterranean formation so as to create a "plug" capable of diverting the flow of fluids present within the subterranean formation (e.g., formation fluids, other treatment fluids) to other portions of the formation. In those embodiments, the breaker then may be allowed to reduce the viscosity of the fluid forming the "plug," which may at least partially restore the flow of fluids through that portion of the subterranean formation.

To facilitate a better understanding of the present invention, the following examples of certain aspects of some embodiments are given. In no way should the following examples be read to limit, or define, the scope of the invention.

EXAMPLE 1

Three samples of treatment fluids were mixed in a Waring Blender, the samples comprising 0.42% by weight CMHPG gelling agent, 0.0016% by weight zirconium glycolate crosslinking agent, and 2% by weight KC1, in tap water obtained in Duncan, Okla. The pH of each fluid sample was adjusted to 4.9±0.1 with about 0.1% to about 0.15% by weight ammonium acetate-acetic acid buffer. Additionally, the following components were added to the three fluid samples: no additional additives to Fluid Sample A; 0.12% by weight sodium bromate breaker added to Fluid Sample B; and 0.003% by weight hydroquinone added to Fluid Sample C (a sample of a treatment fluid of the present invention).

Viscosity measurements of each fluid were taken on a Fann® 50 viscometer equipped with a 420 spring, a 316SS cup and B2X bob according to the following procedure. The bath was preheated to 200° F. A 60 mL sample of each fluid was transferred to the viscometer cup at 75° F. and placed on the viscometer. The cup was rotated at 106 rpm (40 sec$^{-1}$) until the first scan was begun. Shear rate scans were measured for 2 min each at 150, 106, 75, 53, 37, 26 and 18 sec$^{-1}$, with 3 min at 40 sec$^{-1}$ in between scans. Viscosity measurements were taken over a period of almost 140 minutes. A plot of time (min) versus viscosity (cP) for each sample is provided in FIG. 1.

Thus, Example 1 illustrates that breakers comprising hydroquinone may reduce the viscosity of a treatment fluid more effectively than conventional breakers.

EXAMPLE 2

Five samples of treatment fluids were mixed in a Waring Blender, the samples comprising 0.42% by weight CMHPG gelling agent, 0.0016% by weight zirconium glycolate crosslinking agent, 2% by weight KC1, and 0.06% by weight sodium thiosulfate gel stabilizer, in tap water obtained in Duncan, Okla. The pH of each fluid sample was adjusted to 4.9±0.1 with about 0.1% to about 0.15% by weight acetate-acetic acid buffer. Additionally, the following components were added to each of the five fluid samples: no additional additives to Fluid Sample D; 0.12% by weight sodium bromate breaker added to Fluid Sample E; 0.12% by weight sodium bromate breaker and 0.003% by weight hydroquinone added to Fluid Sample F (a sample of a treatment fluid of the present invention); 0.3% by weight sodium bromate breaker added to Fluid Sample G; and 0.3% by weight sodium bromate breaker and 0.012% by weight hydroquinone added to Fluid Sample H (a sample of a treatment fluid of the present invention).

Figure 2:
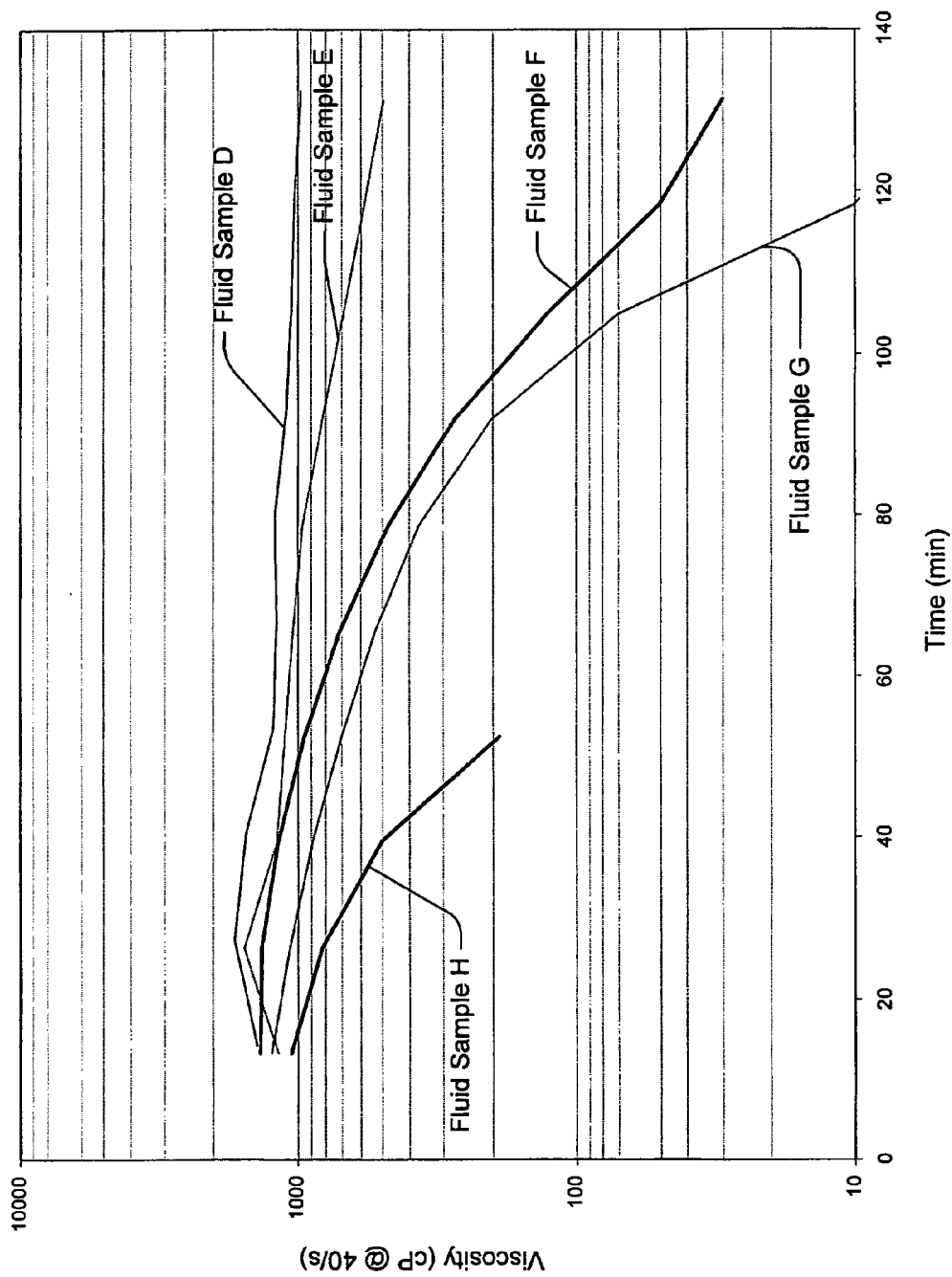
FIG. 2 illustrates other data regarding the change in viscosity over time of various treatment fluids, including certain embodiments of the treatment fluids of the present invention.

Viscosity measurements of each fluid were taken according to the procedure described in Example 1. A plot of time (min) versus viscosity (cP) for each sample is provided in FIG. 2.

Thus, Example 2 illustrates that breakers comprising hydroquinone, in combination with other types of breakers, may reduce the viscosity of a treatment fluid more effectively than conventional breakers alone.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method comprising:
   providing a treatment fluid that comprises an aqueous base fluid and a gelling agent, the treatment fluid having a pH in the range of from about 3 to about 12;
   providing a breaker that comprises a hydroquinone component selected from the group consisting of hydroquinone, semiquinone, benzoquinone, quinhydrone charge-transfer complexes, and combinations thereof;
   allowing the breaker to interact with the treatment fluid; and
   allowing the viscosity of the treatment fluid to reduce.

2. The method of claim 1 wherein the aqueous base fluid is selected from the group consisting of fresh water, saltwater, brines, seawater, and combinations thereof.

3. The method of claim 1 wherein the gelling agent is selected from the group consisting of hydroxyethyl guar, hydroxypropyl guar, carboxymethyl guar, carboxymethylhydroxyethyl guar, carboxymethylhydroxypropyl guar, hydroxyethyl cellulose, carboxyethylcellulose, carboxymethylcellulose, carboxymethylhydroxyethylcellulose, derivatives thereof, and combinations thereof.

4. The method of claim 1 wherein the breaker is present such that the hydroquinone component is present in an amount in the range of from about 0.001% to about 0.3% by weight of the treatment fluid.

5. The method of claim 1 wherein the gelling agent comprises a crosslinked gelling agent wherein at least a portion of the gelling agent is crosslinked by a crosslinking reaction comprising a crosslinking agent.

6. The method of claim 5 wherein the crosslinking agent is selected from the group consisting of boric acid, disodium octaborate tetrahydrate, sodium diborate, pentaborates, ulexite, colemanite, zirconium lactate, zirconium lactate triethanolamine, zirconium carbonate, zirconium acetylacetonate, zirconium malate, zirconium citrate, zirconium diisopropylamine lactate, zirconium glycolate, titanium lactate, zirconium triethanol amine glycolate, zirconium lactate glycolate, zirconium triethanol amine, titanium malate, titanium citrate, titanium ammonium lactate, titanium triethanolamine, titanium acetylacetonate, aluminum lactate, aluminum citrate, antimony compounds, chromium compounds, iron compounds, copper compounds, zinc compounds, derivatives thereof, and combinations thereof.

7. The method of claim 1 wherein the breaker further comprises at least one component selected from the group consisting of sodium chlorite, sodium bromate, sodium persulfate, sodium peroxydisulfate, ammonium chlorite, ammonium bromate, ammonium persulfate, ammonium peroxydisulfate, potassium chlorite, potassium bromate, potassium persulfate, potassium peroxydisulfate, oxidizable metal ions, derivatives thereof, and combinations thereof.

8. The method of claim 1 wherein the pH of the treatment fluid is in the range of from about 4 to about 6.

9. The method of claim 1 wherein the breaker that comprises the hydroquinone component is provided in the same step as providing the treatment fluid.

10. The method of claim 1 further comprising introducing the treatment fluid into at least a portion of a subterranean formation.

11. The method of claim 10 further comprising recovering the treatment fluid from the subterranean formation.

12. A method of treating a portion of a subterranean formation comprising:
   providing a treatment fluid that comprises an aqueous base fluid, and a gelling agent, the treatment fluid having a pH in the range of from about 3 to about 12;
   providing a breaker that comprises a hydroquinone component selected from the group consisting of hydroquinone, semiquinone, benzoquinone, quinhydrone charge-transfer complexes, and combinations thereof;
   introducing the treatment fluid into the portion of the subterranean formation;
   introducing the breaker into the portion of the subterranean formation such that the breaker interacts with the treatment fluid; and
   allowing the viscosity of the treatment fluid to reduce.

13. The method of claim 12 wherein the treatment fluid further comprises a plurality of particulates.

14. The method of claim 12 wherein the gelling agent comprises a crosslinked getting agent wherein at least a portion of the gelling agent is crosslinked by a crosslinking reaction comprising a crosslinking agent.

15. The method of claim 12 wherein introducing the treatment fluid into the portion of the subterranean formation comprises introducing the treatment fluid at or above a pressure sufficient to create or enhance one or more fractures in the subterranean formation.

16. The method of claim 12 further comprising recovering the treatment fluid from the subterranean formation.

17. The method of claim 12 wherein the breaker that comprises the hydroquinone component is provided in the same step as providing the treatment fluid.

18. A method comprising:
   providing a treatment fluid that comprises an aqueous base fluid and a gelling agent;
   providing a breaker that comprises a hydroquinone component, the breaker being substantially free of ammonium persulfates and alkali metal persulfates, and the hydroquinone component being selected from the group consisting of hydroquinone, semiquinone, benzoquinone, quinhydrone charge-transfer complexes, and combinations thereof;
   allowing the breaker to interact with the treatment fluid; and
   allowing the viscosity of the treatment fluid to reduce.

19. The method of claim 18 wherein the gelling agent comprises a crosslinked gelling agent wherein at least a portion of the gelling agent is crosslinked by a crosslinking reaction comprising a crosslinking agent.

* * * * *